United States Patent
Persson

(10) Patent No.: US 8,327,619 B2
(45) Date of Patent: Dec. 11, 2012

(54) METHOD FOR OPERATING AN INTERNAL COMBUSTION ENGINE

(75) Inventor: Per Persson, Partille (SE)

(73) Assignee: Volvo Lastvagnar AB, Göteborg (SE)

(*) Notice: Subject to any disclaimer, the term of this patent is extended or adjusted under 35 U.S.C. 154(b) by 1262 days.

(21) Appl. No.: 12/065,739

(22) PCT Filed: Sep. 12, 2005

(86) PCT No.: PCT/SE2005/001327
§ 371 (c)(1), (2), (4) Date: Mar. 5, 2008

(87) PCT Pub. No.: WO2007/032712
PCT Pub. Date: Mar. 22, 2007

(65) Prior Publication Data
US 2008/0230021 A1    Sep. 25, 2008

(51) Int. Cl.
*F01N 3/00* (2006.01)
*F01L 1/34* (2006.01)
(52) U.S. Cl. .................................... 60/285; 123/90.15
(58) Field of Classification Search .................. 60/273, 60/284, 285, 286, 320; 123/90.15, 332
See application file for complete search history.

(56) References Cited

U.S. PATENT DOCUMENTS

| | | | |
|---|---|---|---|
| 4,391,095 A | 7/1983 | Virk | |
| 5,467,748 A * | 11/1995 | Stockhausen | 123/198 F |
| 6,161,521 A | 12/2000 | Russ et al. | |

(Continued)

FOREIGN PATENT DOCUMENTS

EP    0732489 A1    9/1996

(Continued)

OTHER PUBLICATIONS

Supplementary European Search Report from corresponding European Application EP05777948.

(Continued)

*Primary Examiner* — Thomas Denion
*Assistant Examiner* — Audrey K Bradley
(74) *Attorney, Agent, or Firm* — WRB-IP LLP

(57) ABSTRACT

In a method for operating an internal combustion engine, the engine includes a plurality of cylinders each of which having at least one valve of a first type, an inlet valve, and at least one valve of a second type, an exhaust valve, arranged in an end part of the cylinder, each of the cylinders further having a piston movably arranged therein, the piston being adapted to reciprocate between a first end position and a second end position, wherein the first end position is located closer to the valves than the lower end position, the engine being adapted to allow deactivation of at least one cylinder by reducing its supply of fuel, the engine further being adapted to allow varying opening times of the inlet valves and/or the exhaust valves. The method includes extending the total opening time of at least one valve type of a deactivated cylinder compared to the opening time of the same valve type when the cylinder is active, the extension of the total opening time being performed such that at least one valve of the type is open at least partly both during a first engine stroke, wherein the piston moves in a direction towards its second end position, as well as during a second consecutive engine stroke, wherein the piston moves in a direction towards its first end position.

7 Claims, 3 Drawing Sheets

U.S. PATENT DOCUMENTS

| | | | |
|---|---|---|---|
| 6,332,446 B1 * | 12/2001 | Matsumoto et al. | ....... 123/198 F |
| 6,513,471 B1 * | 2/2003 | Hicks | .......................... 123/90.16 |
| 2004/0255576 A1 | 12/2004 | Brown | |
| 2005/0131618 A1 | 6/2005 | Megli et al. | |

FOREIGN PATENT DOCUMENTS

| | | | |
|---|---|---|---|
| EP | 1054148 A | 11/2000 |
| EP | 1178201 A2 | 2/2002 |

OTHER PUBLICATIONS

International Search Report for corresponding International Application PCT/SE2005/001327.

International Preliminary Report on Patentability for corresponding International Application PCT/SE2005/001327.

* cited by examiner

METHOD FOR OPERATING AN INTERNAL COMBUSTION ENGINE

The invention relates to a method for operating an internal combustion engine that runs with one or several cylinders deactivated. In particular, the invention relates to a method for operating a diesel engine running with both active and deactivated cylinders.

Internal combustion engine exhaust gas after-treatment systems normally need to be operated within a certain temperature interval. Occasionally, the engine operating conditions are such that the exhaust gas temperature becomes too low for the exhaust gas after-treatment system to work properly. Typically, this is a problem that can arise during low load operation conditions of a diesel engine.

One way of increasing the exhaust gas temperature is to use a gas restrictor positioned either on the exhaust side, in order to increases the engine load, or on the inlet side, in order to reduce the amount of air entering the cylinders. This approach has, however, some disadvantages: in the former case it leads to increased fuel consumption and in the latter case it may, at least for a diesel engine, lead to misfire and normally a new component will be required.

As described in e.g. U.S. Pat. No. 6,668,546 another way of increasing the exhaust gas temperature during cold start and low load operating conditions is to deactivate one or several cylinders by interrupting the fuel injection to these cylinders and increase the amount of fuel injected in the cylinders that remain active. This way the exhaust gas temperature of the active cylinders will increase. When a certain cylinder is deactivated cool air will flow through it from the inlet side to the exhaust side if the valves are operated in the same way as the valves of an active cylinder. Such a cool gas flow will decrease the exhaust gas temperature. If the concept of cylinder deactivation is to be used it is thus important to prevent or at least decrease a flow of cold gas (air) via the deactivated cylinder(s).

A conventional solution to this problem for diesel engines is to deactivate the inlet valves of deactivated cylinders so that they are maintained closed. This effect can be achieved with an arrangement commonly referred to as variable valve movements of the "lost motion" type. The result is that the cool air is prevented from flowing through the cylinder as it is not allowed to even enter the cylinder. An effect of this solution is that the pressure in the deactivated cylinder becomes very low during periods of the engine cycles, in particular at the end of the intake stroke/beginning of the compression stroke, and at the end of the expansion stroke (before the exhaust valve opens). This effect has the disadvantage that, at least when the piston is relatively close to its bottom dead center (BDC) position, the cylinder pressure becomes lower than the crank case gas pressure which pose a risk that crank case gas will be transferred from the crank case to the cylinder. Crank case gas contains oil that, if transferred to the cylinder, subsequently will be blown out to the exhaust gas after-treatment system and give rise to increased emission levels and degradation of the catalytic converters. In addition, this leads to an increased consumption of engine oil. The risk of transferring oil to the cylinder is in particular a problem for diesel engines that normally are not equipped with piston rings adapted to prevent transfer of crank gas.

U.S. Pat. No. 6,161,521 discloses another variant of avoiding through-flow of air for Otto-engines where camshaft timing is used to control the valves, and thus the airflow, during so-called deceleration fuel shut off (DFSO) where all cylinders are deactivated at the same time. This variant is, however, not easy to apply to a diesel engine since the camshaft(s) normally can not be phased to the same extent as it involves having the valves open fully, or at least to a large extent, when the piston is at the top dead center (TDC) position which would lead to interference between the valves and the piston. In a diesel engine, working with a much higher compression ratio than an Otto engine, the distance above the piston at TDC is much shorter. Moreover, it is not clear from U.S. Pat. No. 6,161,521 how the principles should be applied in a case where some cylinders are supposed to be active.

From the above it follows that there is a need for improvements in preventing airflow through deactivated cylinders of an internal combustion engine, in particular with regard to diesel engines.

It is desirable to provide an improved method for operating an internal combustion engine that runs with one or several cylinders deactivated.

An aspect of the invention concerns a method for operating an internal combustion engine, said engine comprising a plurality of cylinders each of which having at least one valve of a first type, an inlet valve, and at least one valve of a second type, an exhaust valve, arranged in an end part of the cylinder, each of said cylinders further having a piston movably arranged therein, said piston being adapted to reciprocate between an first end position and a second end position, wherein the first end position is located closer to the valves than the lower end position, said engine being adapted to allow deactivation of at least one cylinder by reducing its supply of fuel, said engine further being adapted to allow varying opening times of the inlet valves and/or the exhaust valves. An aspect of the invention is characterized in that the method comprises the step of extending the total opening time of at least one valve type of a deactivated cylinder compared to the opening time of the same valve type when the cylinder is active, said extension of the total opening time being performed such that at least one valve of said type is open at least partly both during a first engine stroke, wherein the piston moves in a direction towards its second end position, as well as during a second consecutive engine stroke, wherein the piston moves in a direction towards its first end position.

Thus, the same valve, or at least the same type of valve, is open during two consecutive engine strokes resulting in that gas or air that has entered the cylinder during the first stroke will leave the cylinder during the second stroke the same way it entered. Thereby no cool air will pass through the deactivated cylinder. Further, the first engine stroke corresponds to either an intake stroke or an expansion stroke. Conventionally, the valves of a deactivated cylinder are closed during this first engine stroke since the inlet valve is maintained closed in the conventional solution of the "lost motion" type, and since the exhaust valve normally is closed during this stroke. In contrast, according to the inventive method at least one valve is open during this first engine stroke. An advantage according to an aspect of the inventive method is thus that no work is required for overcoming the low pressure created in a cylinder with the valves closed during the first engine stroke. This makes an engine operated according to the invention more efficient. A further advantage is that one avoids the situation of having a very low cylinder pressure during the end of the first engine stroke which eliminates the risk of transferring oil from the crank case to the cylinder.

In a first advantageous embodiment of an aspect of the invention the method comprises the step of extending the total opening time of the at least one inlet valve of a deactivated cylinder, wherein the first engine stroke corresponds to an intake stroke and the second engine stroke corresponds to a compression stroke. Preferably, this is achieved by delaying the time of closure of the inlet valve of a deactivated cylinder compared to the time of closure of the inlet valve when the cylinder is active, or by opening at least one inlet valve during the second engine stroke.

BRIEF DESCRIPTION OF DRAWINGS

In the description of the invention given below reference is made to the following figure(s), in which.

DETAILED DESCRIPTION

Figure 1:
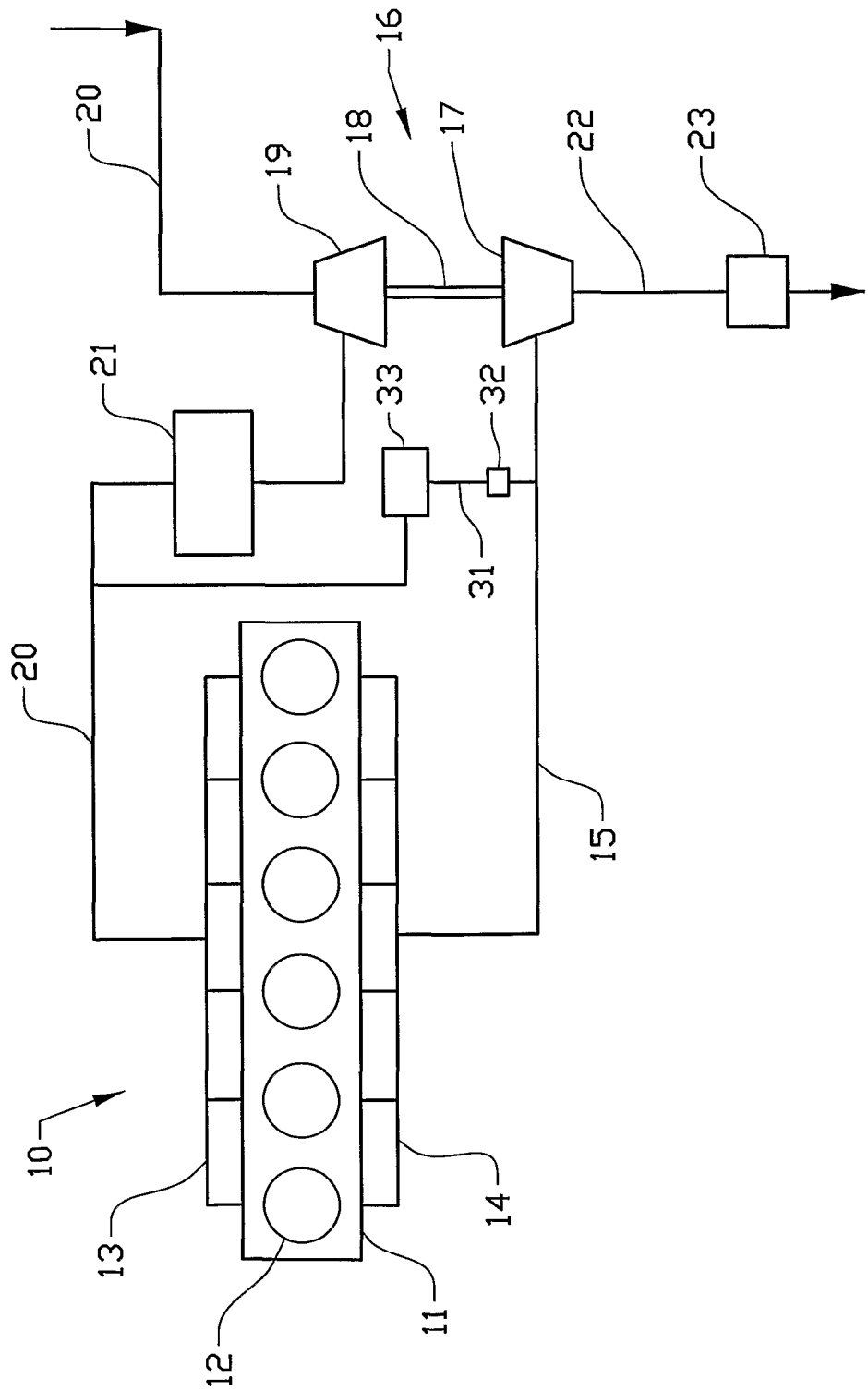
FIG. 1 shows, in a schematic view, a representation of an internal combustion engine to which the invention can be applied.

FIG. 1 gives a schematic representation of an internal combustion engine 10 in the form of a diesel engine. The engine 10 comprises an engine block 11 having six piston cylinders 12 together with inlet manifold 13 and exhaust manifold 14. Exhaust gases from the engine are fed via an exhaust line 15 to a turbine rotor 17 of a turbocharger unit 16. A turbine shaft 18 drives a compressor wheel 19 of the turbocharger unit 16, which by way of an intake line 20 compresses incoming air and delivers it to the inlet manifold 13 via an air intercooler 21. Fuel is fed to each cylinder 12 via fuel injectors 9 (see FIG. 2). Exhaust gases that have passed through the turbocharger unit 16 are led onwards by way of an exhaust line 22 to an exhaust gas after-treatment device 23. Further, the engine 10 has a system for returning exhaust gases to the intake side of the engine 10 as so-called EGR gas, via a pipeline 31. This line comprises an EGR valve 32 and an EGR cooler 33. An engine control unit (not shown) containing e.g. control program is connected to various engine devices, such as the fuel injection system and the EGR valve 32, as well as to a number of sensors (not shown) for determining e.g. engine speed and position of accelerator pedal, for controlling the engine with reference to input data. Although the figure illustrates a six-cylinder engine, the invention can also be used in conjunction with other cylinder configurations.

Figure 2:
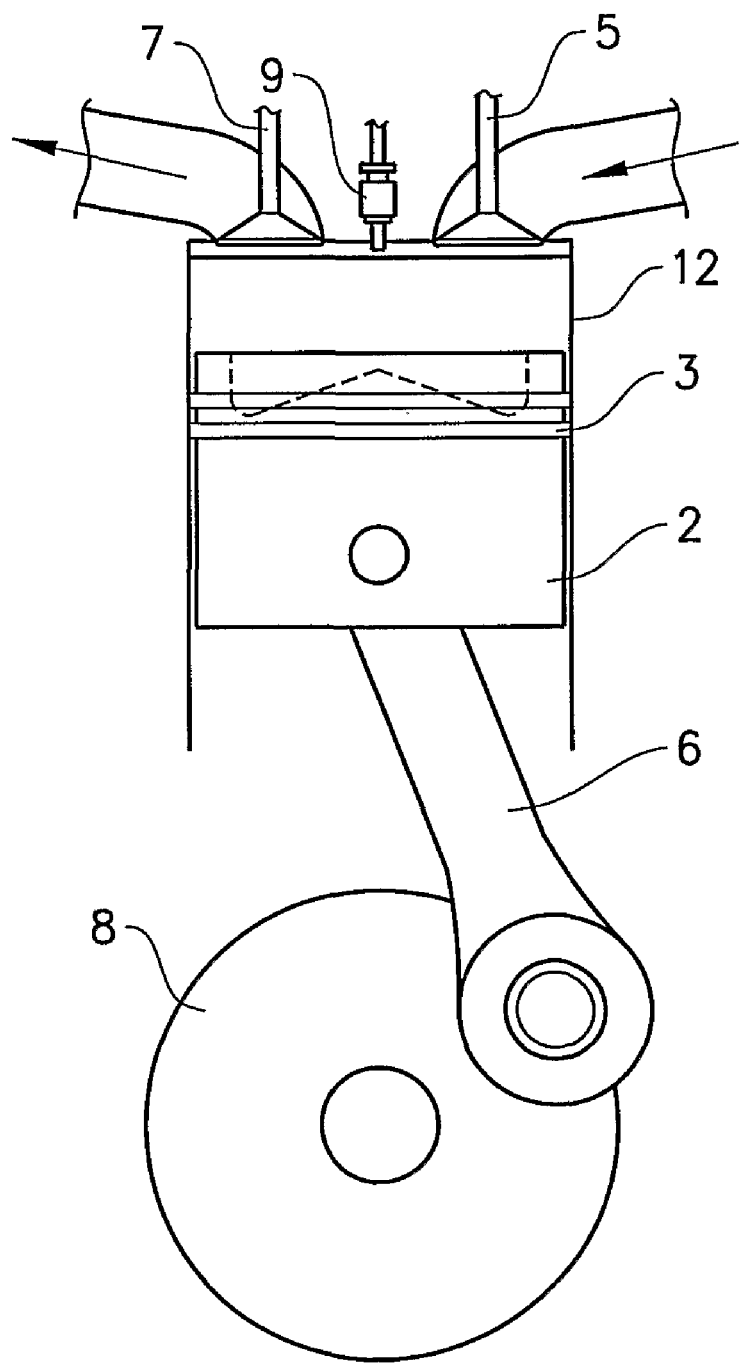
FIG. 2 shows, in a schematic view, a detail of the internal combustion engine according to FIG. 1.

FIG. 2 shows, in a schematic view, one of the cylinders 12 of the engine 10 according to FIG. 1. A piston 2 is reciprocably mounted in a cylinder 12 wherein a connecting rod 6 connects the piston 2 to a crank shaft 8. The piston 2 is provided with piston rings 3. The cylinder 12 is provided with an inlet valve 5 for allowing intake air to enter the cylinder 12 and an exhaust valve 7 for allowing combustion products to leave the cylinder 12. A fuel injector 9 is positioned on top of the cylinder 12.

The operation of the valves 5, 7 during normal, active operation of the cylinder could be controlled in a conventional mechanical way by the movement of a cam shaft (not shown). Alternatively, the valves may be electronically controlled. To achieve a variable valve actuation as further described below one may e.g. use a more sophisticated mechanical system, a conventional mechanical system in combination with a hydraulic arrangement, or electronically controlled actuators. An example of a useful system is disclosed in WO2004/005677.

A conventional operation of a four-stroke internal combustion engine, such as the one showed in FIGS. 1 and 2, can be described in the following principal way:

I. Intake stroke (crank shaft angle 0-180°): The piston 2 moves from a first, upper end position (top dead center, TDC) downwards, towards the crank shaft 8, to a second, lower end position (bottom dead center, BDC). During this stroke the inlet valve 5 is open and the exhaust valve 7 closed so that air flows into the cylinder 12.

II. Compression stroke (crank shaft angle 180-360°): The piston 2 moves from BDC to TDC with both valves 5, 7 closed as to compress the air.

III. Expansion stroke (crank shaft angle 360-540°): The valves 5, 7 are kept closed. Fuel is injected when the piston 2 is close to TDC. The combustion reaction between the fuel and the compressed air forces the piston 2 towards BDC.

IV. Exhaust stroke (crank shaft angle 540-720°): The piston 2 moves from BDC to TDC with the exhaust valve 7 open so that the exhaust gas is pushed out from the cylinder 12.

The terms intake, compression, expansion and exhaust stroke may not be fully adequate when referring to a deactivated cylinder. Nevertheless, these terms are convenient also for describing the operation of a deactivated cylinder and should be interpreted as strokes corresponding to those of an active cylinder.

Figure 3:
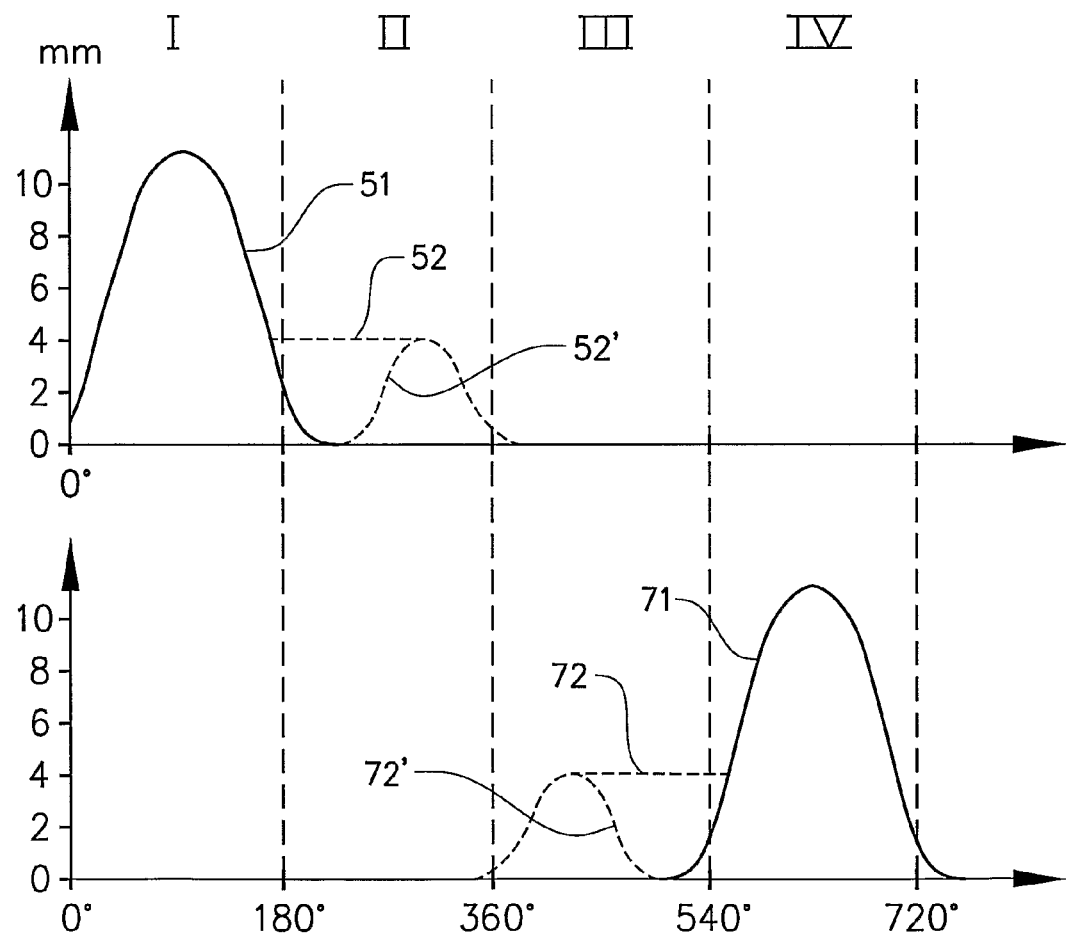
FIG. 3 shows, in a schematic view, movements of an inlet valve and an exhaust valve during conventional operation of an engine, as well as during operation of an engine according to a first and a second embodiment of the present invention.

FIG. 3 shows, in a schematic view, movements of the inlet valve 5 and the exhaust valve 7 during a conventional operation of an engine as described above, as well as examples of movements of the inlet valve 5 and the exhaust valve 7 during operation of an engine according to the invention. The x-axis gives the crank shaft angle in degrees, whereas the y-axis shows a valve lift in mm; the upper part of the y-axis refers to the inlet valve 5 and the lower part of the y-axis refers to the exhaust valve 7. It may be noted that the valve lift is a representation of how much the valve is open, e.g. if the valve lift is zero the valve is closed. The roman numerals I-IV refer to the four engine strokes described above. The solid lines 51 and 71 correspond to the movements of the inlet valve 5 and the exhaust valve 7, respectively, during normal operation of an internal combustion engine. These solid lines 51, 71 thus represent both the normal valve movements of the cylinder 12 when it is activated, as well as any active cylinder in an internal combustion engine regardless of whether the engine is operating with any deactivated cylinder(s) or not.

Referring now to the upper part of FIG. 3 the clashed line 52 correspond to the movements of the inlet valve 5 of a deactivated cylinder in an internal combustion engine operating according to a first embodiment of the invention. The dashed line 52 is only shown where the valve movements differ from the normal situation. As seen from the upper part of FIG. 3, the inlet valve 5 is opened according to normal operation during the intake stroke but it is then maintained open, with a valve lift of around 4 mm, during most of the compression stroke. The inlet valve 5 is not closed until the piston 2 approaches TDC at the end of the compression stroke. The closure of the inlet valve 5 is thus delayed compared to an active cylinder. As seen from the upper part of FIG. 3, the inlet valve 5 is open during a time period corresponding to a crank shaft angle interval of around 360°, wherein said time period includes a point of time where the crank shaft angle is 180° at which the piston 2 is in its lower end position (BDC). Thus, the inlet valve 5 is open both during a first engine stroke, the intake stroke I, wherein the piston 2 moves towards the crank shaft 8, as well as during a second consecutive engine stroke, the compression stroke II, wherein the piston 2 moves away from the crank shaft 8.

Again referring to the upper part of FIG. 3 the dashed line 52' correspond to the movements of the inlet valve 5 of a deactivated cylinder in an internal combustion engine operating according to a variant of the first embodiment of the invention. The dashed line 52' is only shown where the valve movements differ from the normal situation. As seen from the upper part of FIG. 3, the inlet valve 5 is opened and closed according to normal operation during the intake stroke but it is then opened again, up to a valve lift of around 4 mm, during the compression stroke. At the valve lift of around 4 mm the two dashed lines 52 and 52' coincide. Thus, again the inlet valve 5 is not closed until the piston 2 approaches TDC at the end of the compression stroke. Also in this case the inlet valve 5 is open both during a first engine stroke, the intake stroke I, wherein the piston 2 moves towards the crank shaft 8, as well as during a second consecutive engine stroke, the compression stroke II, wherein the piston 2 moves away from the crank shaft 8.

A result of this delayed closing, or additional post-opening, of the inlet valve 5 is that the air that has entered the deactivated cylinder 12 during the intake stroke is free to leave, and will leave, the cylinder 12 via the open inlet valve 5 during the following compression stroke. Since the inlet valve 5 is closed during the next two strokes, i.e. the expansion and exhaust strokes, no cool air will pass the cylinder and mix with, and thereby cool, the exhaust gas downstream the cylinder. An advantage of letting the inlet valve 5 be open during both the intake and the compression strokes, compared to the conventional solution of the "lost motion" type where the inlet valve 5 is maintained closed, is that no work is required for overcoming the low pressure created in the cylinder 12 with the inlet valve 5 closed during the intake stroke. This makes an engine operated according to the invention more efficient. A further advantage is that one avoids the situation of having a very low cylinder pressure during the end of the intake stroke and the beginning of the compression stroke which eliminates the risk of transferring oil from the crank case to the cylinder during these strokes.

Referring now to the lower part of FIG. 3 the dashed line 72 correspond to the movements of the exhaust valve 7 of a deactivated cylinder in an internal combustion engine operating according to a second embodiment of the invention. As above, the dashed line 72 is only shown where the valve movements differ from the normal situation. As seen from the lower part of FIG. 3, the exhaust valve 7 is opened already at the beginning of the expansion stroke. After that it is maintained open during the expansion stroke with a valve lift of around 4 mm and then, conventionally, held open during the exhaust stroke. The exhaust valve 7 is thus opened shortly after the piston 2 leaves TDC at 360° between the compression stroke and the expansion stroke. The opening of the exhaust valve 7 is thus advanced compared to an active cylinder. As seen from the lower part of FIG. 3, the exhaust valve 7 is open during a time period corresponding to a crankshaft angle interval of almost 360°, wherein said time period includes a point of time where the crankshaft angle is 540° at which the piston is in its lower end position (BDC). Thus, the exhaust valve 7 is open both during a first engine stroke, the expansion stroke III, wherein the piston 2 moves towards the crank shaft 8, as well as during a second consecutive engine stroke, the exhaust stroke IV, wherein the piston 2 moves away from the crank shaft 8.

Again referring to the lower part of FIG. 3 the dashed line 72' correspond to the movements of the exhaust valve 7 of a deactivated cylinder in an internal combustion engine operating according to a variant of the second embodiment of the invention. As above, the dashed line 72 is only shown where the valve movements differ from the normal situation. As seen from the lower part of FIG. 3, the left parts of the two dashed lines 72 and 72' coincide which means that also in this case the exhaust valve 7 is opened already at the beginning of the expansion stroke, i.e. about at the point of time when the piston 2 leaves TDC at 360° between the compression stroke and the expansion stroke. However, after a valve lift of around 4 mm the exhaust valve 7 is in this variant closed again during a later stage of the expansion stroke whereupon the exhaust valve 7 is conventionally operated, i.e. open, during the exhaust stroke. Also in this case the exhaust valve 7 is open both during a first engine stroke, the expansion stroke III, wherein the piston 2 moves towards the crank shaft 8, as well as during a second consecutive engine stroke, the exhaust stroke IV, wherein the piston 2 moves away from the crank shaft 8.

A result of this advanced opening, or additional pre-opening, of the exhaust valve 7 is that a portion of exhaust gas is allowed to enter the cylinder 12 via the open exhaust valve 7 during the expansion stroke. In the next stroke, the exhaust stroke, this portion of gas will leave the cylinder 12 the same way it entered. An advantage of keeping the exhaust valve 7 open during both the expansion and the exhaust strokes, compared to the normal case where the exhaust valve 7 is open only during the expansion stroke, is that no work is required for overcoming the low pressure created in the cylinder with the exhaust valve 7 closed during the expansion stroke. In similarity to what is described above regarding the inlet valve 5, this makes an engine operated according to the invention more efficient. A further advantage is that one avoids the situation of having a very low cylinder pressure during the end of the expansion stroke which eliminates the risk of transferring oil from the crank case to the cylinder at this stage.

Common to the embodiments and variants of the invention described above is that the valve, i.e. either the inlet valve 5 or the exhaust valve 7, is open both during a first engine stroke wherein the piston 2 moves in a direction towards the crank shaft 8, i.e. away from the valves 5, 7, as well as during a second consecutive engine stroke, i.e. an engine stroke following directly after the first engine stroke, wherein the piston 2 moves in a direction away from the crank shaft 8, i.e. towards the valves 5, 7. A further common feature is that the total opening time of the valve, i.e. either the inlet valve 5 or the exhaust valve 7, is extended compared to the opening time of the valve when the cylinder 12 is active, i.e. during normal operation of the cylinder 12.

The inventive way of varying the movements of the inlet valve 5 as described above may in principle be applied regardless of the movements of the exhaust valve 7. However, to ensure that the amounts of cool air flowing through the cylinder 12 stays at a minimum the exhaust valve 7 is preferably maintained closed at least during the compression stroke, which also is the case during normal operation of the exhaust valve 7. Conversely, the inventive way of varying the movements of the exhaust valve 7 as described above may in principle be applied regardless of the movements of the inlet valve 5. If the movements of the inlet valve 5 are carried out according to a normal operation of an active cylinder 12, i.e. according to the solid line 51 in FIG. 2, there is no point in opening the exhaust valve 7 already in the expansion stroke with respect to air-flow through the cylinder 12. However, in such a case the temperature of the air leaving the cylinder 12 via the exhaust valve 7 has been increased due to compression in the former engine stroke. This heat of compression may be used to increase the temperature of the exhaust gas. If, on the other hand, the inlet valve 5 is maintained closed the abovementioned advantages of the inventive way of varying the movements of the exhaust valve 7 will be achieved.

The most advantageous effect is, however, achieved by combining the inventive way of varying the movements of both the inlet valve 5 and the exhaust valve 7. This way all the abovementioned advantages regarding air-flow, efficiency and pressure difference will be carried into effect. As seen from FIG. 3 the inlet valve 5 and the exhaust valve 7 are in principle not open at the same time which reduces the risk of transferring cold air to the exhaust side.

The invention may be carried out with an internal combustion engine that is adapted to allow deactivation of at least one cylinder by reducing its supply of fuel and that is adapted to allow varying opening times of the inlet valves and/or the exhaust valves. Valve movements or variable valve actuation can for instance be controlled using electronic actuators, mechanical systems or a combined system involving a hydraulic arrangement. An example of an arrangement that may be used for controlling at least the inlet valves according to the invention is disclosed in WO2004/005677. The arrangement disclosed comprises a hydraulic circuit that is used to vary the inlet valve closure during the intake stroke in order to switch between different operating modes. This arrangement could be modified as to delay the closure of an inlet valve of a deactivated cylinder until some point of time during the compression stroke, thereby extending the time period during which the valve is open.

In FIG. 3 the inventive method is exemplified with a valve lift of 4 mm. Further, the invention is exemplified with an extended valve opening time of around 180°, as seen from the dashed lines 52 and 72, leading to a total opening time of around 360°, i.e. around two engine strokes, for each type of valve. Still further, the invention is exemplified with post- and pre-openings of around 90° as seen from the dashed lines 52' and 72'. These figures are only given as suitable figures for a given engine and should not be interpreted as any type of limitation of the invention. The advantageous effects of the invention are significant, and in many cases also sufficient, also with lower valve lifts and shorter opening times than shown in FIG. 3. Given the information in this text it would be possible for a man skilled in the art to test out suitable valve lifts and opening times for a particular engine. Regarding the first parameter, the valve lift, there is typically a threshold value that should be exceeded to get a sufficient flow of gas into or out from the cylinder. This threshold value may be around 1 mm. Regarding the second parameter, the valve opening time, the advantageous effects will, in principal, increase with the duration of the opening as long as the valves are open during the adequate engine strokes as described above.

The invention is not limited to the embodiments described above but can be modified in various ways within the scope of the claims. For instance, the cylinder 12 may comprise more than one inlet valve 5 and/or more than one exhaust valve 7. To achieve the advantages of the invention it is sufficient that one inlet valve 5 and/or exhaust valve 7 is controlled according to the invention. It is also possible to let a set of valves of similar type co-operate such that the combination of a particular set of valves is operated according to the inventive method described above. For instance, one inlet valve 5 may be open during the intake stroke whereas another inlet valve 5 may be post-opened during the compression stroke.

The invention is focused on operation of deactivated cylinders in a diesel engine in a low-load situation with the main purpose of increasing the exhaust gas temperature, or at least decreasing the cooling of the exhaust gas, wherein one or several cylinders are deactivated while one or several cylinders operate with an increased fuel supply in a normal active mode. In such a case the inventive method preferably comprises one or several of the following steps: determining a representation of the engine load, determining a representation of the exhaust gas temperature, reducing the fuel supply to the cylinders to be deactivated, and increasing the fuel supply to the active cylinders. However, the invention may be applied also in other situations such as during DFSO of Otto engines.

Further, the invention is not limited to a situation where a certain number, or fraction, of cylinders is deactivated. For other reasons, such as to avoid engine vibrations, it may, however, be advantageous to deactivate a certain number of cylinders in a particular engine. For instance, for an engine with six cylinders it is normally an advantage to deactivate three cylinders instead of one. If such an engine is divided into two cylinder banks one may use one of these banks for deactivation and thus adapt only this bank to the inventive method.

The fundamental idea underlying the invention is that a valve of a deactivated cylinder is open at least partly during each of two consecutive engine strokes as to avoid a very low cylinder pressure, or at least decrease the number of low-pressure occasions, while at the same time avoiding that cool gas (air) is transported via the cylinder to the exhaust gas after-treatment system.

In another embodiment of the invention the order of the valve opening of the deactivated cylinder 12 is reversed such that the exhaust valve 7 is open during the intake stroke and/or the compression stroke and the intake valve 5 is open during the expansion stroke and/or the exhaust strokes.

The invention claimed is:

1. A method for operating an internal combustion engine for increasing exhaust gas temperature, the engine comprising a plurality of cylinders, each of the cylinders having at least one valve of a first type, an inlet valve, and at least one valve of a second type, an exhaust valve, arranged in an end part of each of the cylinders, each of the cylinders further having a piston movably arranged therein, the piston being adapted to reciprocate between a first end position and a second end position, wherein the first end position is located closer to the valves than the second end position, the engine being adapted to allow deactivation of at least one cylinder by reducing its supply of fuel, the engine further being adapted to allow varying opening times of at least one of the exhaust valves, the method comprising:
    moving the first and second valve types of a deactivated cylinder between open and closed positions;
    increasing a fuel supply to at least one active cylinder, and
    extending a total opening time of at least one exhaust valve of a deactivated cylinder compared to an opening time of the same valve when the cylinder is active, the extension of the total opening time being performed such that the at least one exhaust valve is open at least partly both during an expansion stroke, wherein the piston moves in a direction towards its second end position, as well as during a consecutive exhaust stroke, wherein the piston moves in a direction towards its first end position.

2. The method according to claim 1, comprising extending the total opening time of the at least one inlet valve of a deactivated cylinder compared to an opening time of the same valve when the cylinder is active, the extension of the total opening time being performed such that at least one inlet valve is open at least partly during both an intake stroke, wherein the piston moves in the direction towards its second end position, as well as during a consecutive compression stroke, wherein the piston moves in the direction towards its first end position.

3. The method according to claim 1, wherein the engine is a diesel engine.

4. The method according to claim 1, comprising advancing the opening time of the exhaust valve of a deactivated cylinder compared to the opening time of the exhaust valve when the cylinder is active.

5. The method according to claim 4, comprising extending the total opening time of the at least one inlet valve of a deactivated cylinder compared to an opening time of the same valve when the cylinder is active, the extension of the total opening time being performed such that at least one inlet valve is open at least partly during both an intake stroke, wherein the piston moves in the direction towards its second end position, as well as during a consecutive compression stroke, wherein the piston moves in the direction towards its first end position.

6. The method according to claim 4, comprising opening at least one exhaust valve during the expansion stroke.

7. The method according to claim 6, comprising extending the total opening time of the at least one inlet valve of a deactivated cylinder compared to an opening time of the same valve when the cylinder is active, the extension of the total opening time being performed such that at least one inlet valve is open at least partly during both an intake stroke, wherein the piston moves in the direction towards its second end position, as well as during a consecutive compression stroke, wherein the piston moves in the direction towards its first end position.

* * * * *